UNITED STATES PATENT OFFICE.

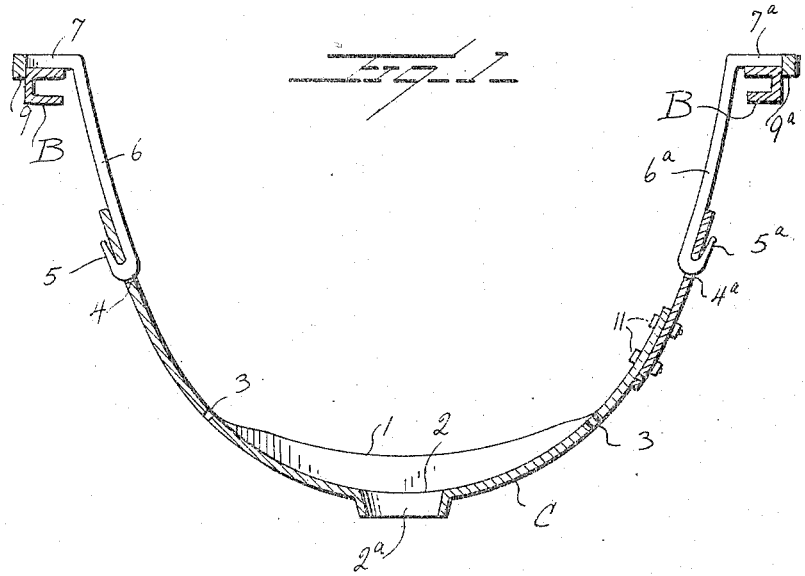
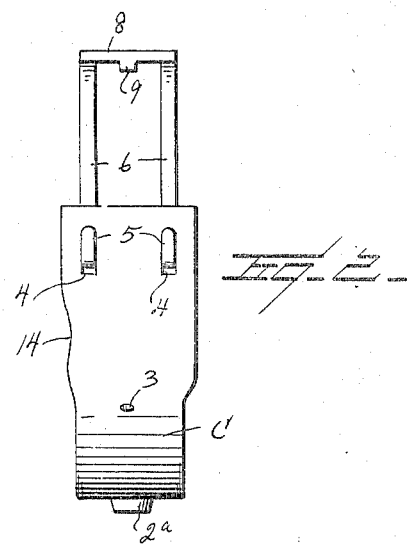
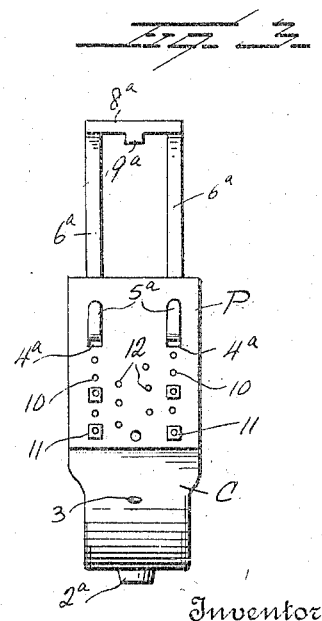

ANGELO VALLE, OF AGUILAR, COLORADO.

ENGINE-SUPPORT.

1,325,816.

Specification of Letters Patent. Patented Dec. 23, 1919.

Application filed May 10, 1919. Serial No. 296,168.

*To all whom it may concern:*

Be it known that I, ANGELO VALLE, a citizen of Italy, first U. S. citizen papers, residing at Aguilar, in the county of Las Animas and State of Colorado, have invented certain new and useful Improvements in Engine-Supports, of which the following is a specification, reference being had to the accompanying drawings.

This invention relates to certain improvements in engine supports and has relation more particularly to a device of this general character especially designed and adapted for use in the support of a motor of an automobile, and it is an object of the invention to provide a novel and improved device of this general character which may be employed with facility and convenience in the case of emergency.

It is also an object of the invention to provide a novel and improved device of this general character which is particularly designed and adapted for use in connection with the transmission case or cover of an internal combustion engine as it often occurs that the original supporting members or braces coacting with the side bars of the frame of the vehicle and the transmission case or cover break, resulting in a lowering of the engine with a consequent failure of the engine to continue its motion as the drive shaft is lowered and thrown out of connection.

The invention consists in the details of construction and in the combination and arrangement of the several parts of my improved engine support whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in elevation and partly in section of a support constructed in accordance with an embodiment of my invention.

Fig. 2 is a view in elevation of one end of the device as illustrated in Fig. 1, and Fig. 3 is a view in elevation of the opposite end of the device as disclosed in Fig. 1.

As is disclosed in the accompanying drawings, my improved support comprises a cradle C preferably arcuate in form and which has its central portion provided with the upstanding marginal flanges 1. The central portion of the cradle C is provided with a drain opening 2 and adjacent its opposite end portions with the additional drain openings 3.

One end portion of the cradle C is provided with a pair of transversely spaced slots 4 through which are adapted to be directed the upwardly facing hook members 5 preferably formed of soft steel. The hook members 5 are provided with the elongated shanks 6 having their upper end portions outwardly and laterally extended, as at 7, to rest upon a side bar B of the frame or chassis of the vehicle.

The outer extremities of the portion 7 are connected by the cross member 8 integral therewith and the central portion of said cross member 8 is provided with a depending lug 9 coacting with the side bar B to prevent slipping. As illustrated in Fig. 1, the lug 9 is seated within the opening in the side bar B through which was initially disposed a bolt for holding an original brace to the bar, as is particularly embodied in the structure of the well known Ford automobile.

Adjustably engaged with the opposite end portion of the cradle C is a plate P provided in its outer end portion with the transversely spaced openings $4^a$ through which are directed the hook members $5^a$. The hook members $5^a$ are provided with the shanks $6^a$ having their upper extremities terminating in the outwardly and laterally directed extensions $7^a$ overlying the second side bar of the frame or chassis and a cross member $8^a$ connecting the outer ends of the portions $7^a$ is also provided midway its length with a depending lug $9^a$ for the same purpose as just recited with respect to the lug 9.

The inner end portion of the plate P at its opposite sides is provided with the vertical series of openings 10 through certain of which are directed the holding bolts 11 also directed through the coacting end portion of the cradle C. By this means, the plate P and cradle C may be adjustably connected one relatively to the other as the occasions of practice may require.

The plate P is also provided with a series of longitudinally spaced openings 12 through which a punch or other member is adapted to be directed for drawing the plate P and the adjacent end portion of the cradle C together in order to facilitate their assemblage.

The cradle C is adapted to receive the lower portion of the casing or cover at the transmission end of an internal combustion engine or the like and support the same in a manner so that the driving shaft will be properly lined.

My improved support is particularly adapted for use in an occasion of emergency. It often occurs that the original braces extending from the frame bars to the transmission case or cover break or become loose at the rivets due to driving over rough roads, jumps, or overloading the car. In such event, my improved support may be readily applied in a short period of time and the car can continue on its journey, as the support serves to maintain the transmission end of the motor in desired position.

The opening 2 is defined by a depending flange 2ª and said opening 2 is of a size to permit direct engagement therethrough of the head of a jack with the engine so that said lowered engine may be properly elevated for adjustment.

The invention as herein disclosed is particularly adapted for use with the Ford automobile and for which reason a marginal portion of the cradle C is recessed or inwardly curved, as at 14, to provide space for the oil pet cock.

From the foregoing description, it is thought to be obvious that an engine support constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the class described comprising a cradle and supporting means coacting with opposite end portions of the cradle, each of said means including a pair of hook members engaged with the cradle and provided with shanks, the outer ends of the shank being extended outwardly and laterally, said extended portions being connected by a cross member, said cross member having a depending lug at its central portion.

2. A device of the class described comprising a cradle, supporting means engageable with an end portion of the cradle, a plate adjustably engaged with the opposite end portion of the cradle, and supporting means coacting with the plate, said plate being provided with longitudinally spaced openings for the insertion therethrough of an implement to facilitate the assemblage of the plate and cradle.

In testimony whereof I hereunto affix my signature in the presence of two witnesses.

ANGELO VALLE.

Witnesses:
N. J. VALLE,
W. B. HUGHES.